United States Patent [19]

Shibahata et al.

[11] Patent Number: 5,437,583

[45] Date of Patent: Aug. 1, 1995

[54] TORQUE DISTRIBUTING MECHANISM FOR DIFFERENTIAL

[75] Inventors: Yasuji Shibahata; Shoji Tokushima, both of Wako, Japan

[73] Assignee: Honda Giken Kogyo Kabushiki Kaisha, Tokyo, Japan

[21] Appl. No.: 208,112

[22] Filed: Mar. 9, 1994

[30] Foreign Application Priority Data

Apr. 16, 1993 [JP] Japan .................................. 5-089903
Apr. 16, 1993 [JP] Japan .................................. 5-089904

[51] Int. Cl.[6] .............................................. F16H 47/04
[52] U.S. Cl. ...................................... 475/220; 475/84; 475/151
[58] Field of Search ...................... 475/72, 74, 84, 248, 475/150, 151, 220, 221, 223

[56] References Cited

U.S. PATENT DOCUMENTS

| 5,052,988 | 10/1991 | Ishikawa et al. | 475/150 |
| 5,141,072 | 8/1992 | Shibahata | 475/84 X |
| 5,226,860 | 7/1993 | Baxter, Jr. et al. | 475/248 X |

*Primary Examiner*—Charles A. Marmor
*Assistant Examiner*—Peter Kwon
*Attorney, Agent, or Firm*—Armstrong, Westerman, Hattori, McLeland & Naughton

[57] ABSTRACT

A torque distributing mechanism includes a first and a second planetary gear mechanism. Among pairs of planetary carriers, ring gears and sun gears in these planetary gear mechanisms, one of the pairs are coupled to two output elements of a differential; another pair are relatively non-rotatably connected to each other, and one of the components of the remaining pair is fixed, while the other is connected to a driving source. Thus, it is possible to reduce the diametrical dimension and weight of the torque distributing mechanism and to improve the degree of freedom in design.

6 Claims, 5 Drawing Sheets

TORQUE DISTRIBUTING MECHANISM FOR DIFFERENTIAL

BACKGROUND OF THE INVENTION

1. Field of the Invention

The present invention relates to a torque distributing mechanism for a differential comprising a single input element and two output elements, wherein a torque applied to the input element of the differential is distributed to the two output elements at a predetermined ratio.

2. Description of the Prior Art

The differential provided in a power transmitting system in an automobile is arranged to absorb a difference in rotational speed produced between left and right wheels during turning of the automobile and to distribute a torque of an engine to the left and right wheels at an appropriate ratio. However, the commonly used differential is operated by a difference between loads applied the left and right wheels and hence, suffers from a problem that when one of the wheels runs onto a road surface having a smaller friction coefficient and such wheel races, the amount of torque transmitted to the other wheel is decreased, or the transmission of the torque is blocked.

In order to avoid such disadvantage, a torque distributing mechanism for a differential has already been proposed by the present applicant (see Japanese Patent Application Laid-open No. 321435/92), and which is designed to positively control the differential on the basis of an angle of rotation of a steering wheel and/or a vehicle speed to distribute a torque suitable for the operational condition to the left and right wheels.

FIG. 5 illustrates the structure of a conventional torque distributing mechanism for a differential. As shown in FIG. 5, a planetary gear type differential D, to which a driving force of an engine E is transmitted through a transmission M, includes a ring gear 01 serving as an input element, a planetary carrier 02 serving as a first output element, and a sun gear 03 serving as a second output element. The planetary carrier 02 is connected to a right wheel $W_R$, and the sun gear 03 is connected to a left wheel $W_L$. A planetary gear mechanism P for distributing torque to the right and left wheels $W_R$ and $W_L$ includes a sun gear 05 driven by a motor 04, a planetary carrier 06 coupled to the sun gear 03 of the differential D, and a ring gear 07 connected to the planetary carrier 02 of the differential D. The connection of the planetary carrier 02 with the ring gear 07 is achieved by allowing a pair of spur gears 010 and 011, coupled coaxially, to be meshed with an external-tooth gear 08 provided on the planetary carrier 02 and an external-tooth gear 09 provided on the ring gear 07, respectively.

The torque of the engine E is transmitted to the right and left wheels $W_R$ and $W_L$ at a predetermined ratio by driving the motor 04 for normal and reverse rotations at a predetermined rotational number.

However, the above-described prior art torque distributing mechanism for the differential is accompanied not only by a problem that a diametrical dimension is increased by a value corresponding to the spur gears 010 and 011, because the ring gear 09 of the planetary gear mechanism P and the planetary carrier 02 of the differential D are connected to the torque distributing mechanism through the pair of spur gears 010 and 011, but also by a problem that the total weight is increased, because of a large torque is applied to the spur gears 010 and 011. Further, the prior art mechanism has a problem that the degree of freedom in design is restricted, because it is necessary for the radius $r_1$ of the external-tooth gear 09, provided on the ring gear 07, and the radius $r_2$ of the external-tooth gear 08, provided on the planetary carrier 02, to satisfy a relation $$r_2/r_1 = 1 + (Z_s/Z_r) \tag{1}$$

wherein $Z_s$ and $Z_r$ represent the numbers of teeth of the sun gear 05 and the ring gear 07 of the planetary gear mechanism P, respectively.

In order to reduce the size of such torque distributing mechanism for the differential, it is desirable to use a small-sized and lightweight motor. However, the small-sized and lightweight motor only delivers smaller torque and hence, it is necessary to increase the reduction ratio to amplify the torque.

In order to amplify the torque of the motor 04 in the prior art torque distributing mechanism for the differential, it is necessary to reduce the number of teeth of a pinion 012, provided on an output shaft of the motor, and to set the number of teeth of an external-tooth gear 013, provided integrally with the sun gear 05, at a large value. However, there is a limit to reduce the number of teeth of the pinion 012 and moreover, there is a problem that if the number of teeth of the external-tooth gear 013 is increased, the diametrical dimension of the torque distributing mechanism is increased.

SUMMARY OF THE INVENTION

Accordingly, it is an object of the present invention to provide a torque distributing mechanism for a differential, in which the diametrical dimension and weight thereof can be reduced and which, moreover, has a high degree of freedom in design.

To achieve the above object, according to a first aspect and feature of the present invention, there is provided a torque distributing mechanism for a differential which comprises a single input element and two output elements and in which a torque applied to the input element of the differential is distributed to the two output elements at a predetermined ratio. The torque distributing mechanism comprises a first planetary gear mechanism having a first ring gear, a first sun gear, and a first planetary carrier, which supports a first planetary gear meshed with the first ring gear and the first sun gear, and a second planetary gear mechanism comprised of a second ring gear, a second sun gear, and a second planetary carrier which supports a second planetary gear meshed with the second ring gear and the second sun gear; among a pair of the first and second planetary carriers, a pair of the first and second ring gears and a pair of the first and second sun gears, any one of the pairs being coupled to the two output elements, respectively, another pair being relatively non-rotatably connected to each other, and one of the rest pair being fixed, while the other of the rest pair being connected to a driving source.

With the above construction, the need for a spur gear for connecting the differential with the planetary gear mechanism of the torque distributing mechanism is eliminated. This enables the diametrical dimension of the torque distributing mechanism to be reduced. Moreover, the setting of the number of teeth of each gear of the planetary gear mechanism, which is required when the spur gear is used, is not required, leading to an improved degree of freedom in design. Further, a torque distributed to the two output elements of the differential is dispersed to the first planetary gear mechanism, the second planetary gear mechanism and the differential, and therefore, it is possible to lower the strength of each gear and reduce the total weight.

It is another object of the present invention to provide a torque distributing mechanism for a differential, in which a driving source, delivering a small torque, can be used without increasing the diametrical dimension of the torque distributing mechanism.

To achieve the above object, according to a second aspect and feature of the present invention, there is provided a torque distributing mechanism for a differential which comprises a single input element and two output elements, in which a torque applied to the input element of the differential is distributed to tile two output elements at a predetermined ratio. The torque distributing mechanism comprises a first planetary gear mechanism having a first ring gear, a first sun gear, and a first planetary carrier which supports a first planetary gear meshed with the first ring gear and the first sun gear, and a second planetary gear mechanism comprised of a second ring gear, a second sun gear, and a second planetary carrier which supports a second planetary gear meshed with the second ring gear and the second sun gear. Among the first and second planetary carriers, a pair of the first and second ring gears and a pair of the first and second sun gears, any one of the pairs are coupled to the two output elements, respectively, another pair being relatively non-rotatably connected to each other, and the remaining pair being connected to a driving source at different gear ratios from each other.

With the above construction, when a driving force is transmitted from the driving source to the first and second planetary gear mechanisms to cause the differential to perform a differential motion, the torque of the driving source can be reduced, even if the number of revolutions of the driving source is reduced, at a large reduction ratio. This makes it possible to use a small-torque type small-sized and lightweight driving source with a reduced number of teeth of each element connected to the driving source, while avoiding an increase in size of the torque distributing mechanism.

The above and other objects, features and advantages of the invention will become apparent from the following description of preferred embodiments, taken in conjunction with the accompanying drawings.

DESCRIPTION OF THE PREFERRED EMBODIMENTS

The present invention will now be described by way of preferred embodiments in connection with the accompanying drawings.

Figure 1:
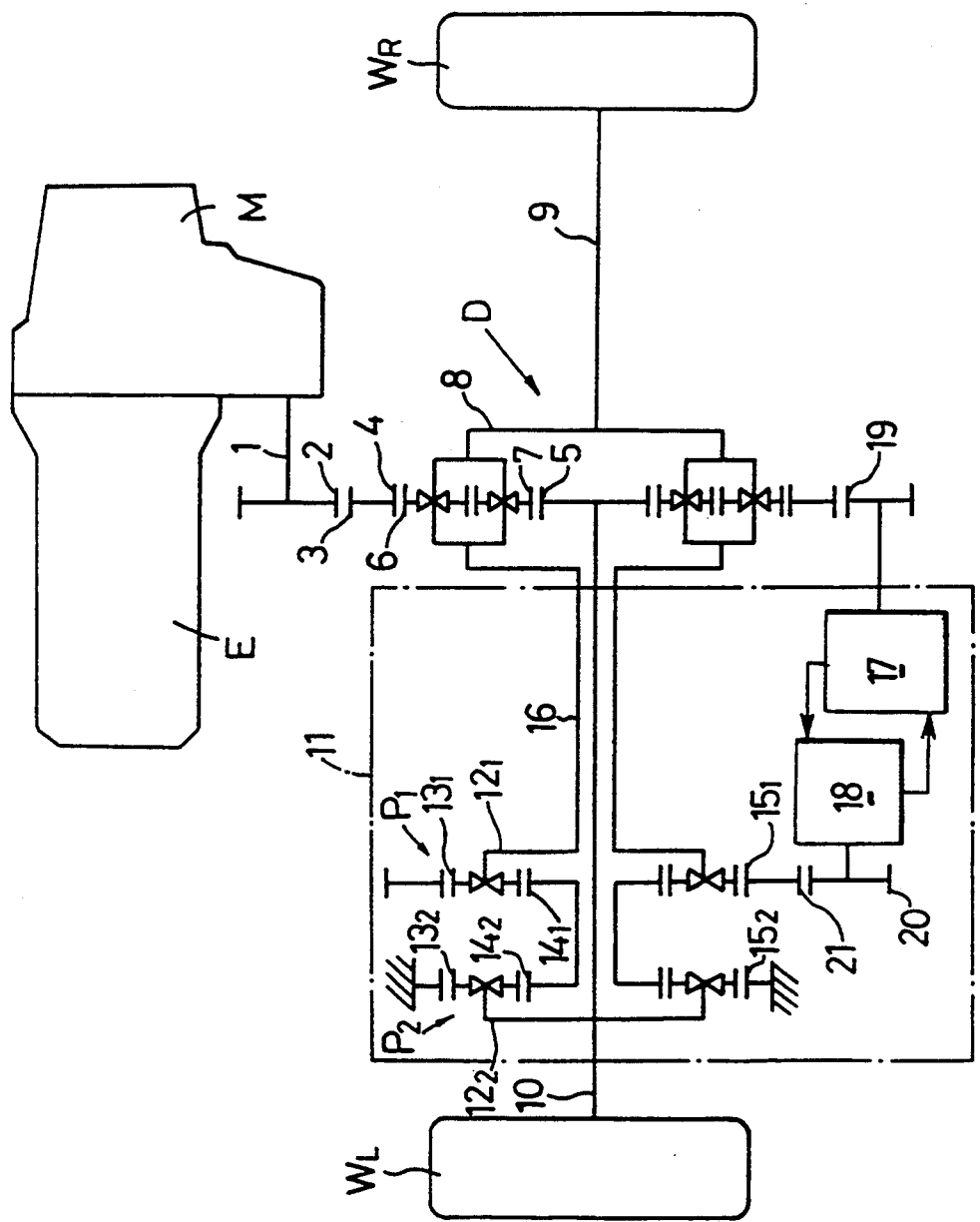
FIG. 1 is an illustration of a torque distributing mechanism for a differential according to a first embodiment of the present invention.

FIG. 1 shows a torque distributing mechanism for a differential according to a first embodiment of the present invention, which is applied to a front engine and front drive vehicle. As shown in FIG. 1, a transmission M is connected to an engine E which is laterally mounted in a vehicle body. A differential input shaft 1, which is an output shaft of the transmission M, includes an input gear 2 for transmitting a driving force to a planetary gear type differential D.

The differential D includes a planetary carrier 8 which carries following gears in a mutually meshed relation: a ring gear 4 having an external-tooth gear 3 on an outer periphery, which is meshed with the input gear 2 of the differential input shaft 1, a sun gear 5 coaxially disposed inside the ring gear 4, an outer planetary gear 6 meshed with the ring gear 4 and an inner planetary gear 7 meshed with the sun gear 5. In the differential D, the ring gear 4 thereof functions as an input element. The planetary carrier 8 functioning as one of output elements is connected through a right shaft 9 to a right wheel $W_R$, while the sun gear 5 functioning as the other output element is connected through a left shaft 10 to a right wheel $W_L$.

The structure of a torque distributing mechanism 11 will be described which distributes a torque received from the ring gear 4 which is the input element of the differential D to the two output elements, i.e., the planetary carrier 8 and the sun gear 5 at a predetermined ratio.

The torque distributing mechanism 11 includes a first plantetary gear mechanism $P_1$ and a second planetary gear mechanism $P_2$ which are juxtaposed on the left shaft 10 and have the same specification. The first planetary gear mechanism $P_1$ includes a first planetary carrier $12_1$, a first planetary gear $13_1$, a first sun gear $14_1$ and a first ring gear $15_1$. The first planetary carrier $12_1$ is integrally coupled to the planetary carrier 8 of the differential D through a sleeve 16 fitted over an outer periphery of the left shaft 10.

The second planetary gear mechanism $P_2$ includes a second planetary carrier $12_2$, a second planetary gear $13_2$, a second sun gear $14_2$ and a second ring gear $15_2$. The second planetary carrier $12_2$ is coupled to the left shaft 10. The second ring gear $15_2$ is nonrotatably fixed to a casing, and the second sub gear $14_2$ is formed integrally with the first sun gear $14_1$.

The torque distributing mechanism 11 includes a hydraulic pump 17 driven by the engine E, and a hydraulic motor 18 driven by an oil discharged from the hydraulic pump 17. The hydraulic pump 17 is driven with a pinion 19 fixed to an input shaft of the hydraulic pump 17 and meshed with the teeth of external-tooth gear 3 of the differential D. The hydraulic motor 18 drives the torque distributing mechanism 11 with a pinion 20 fixed to an output shaft of the hydraulic motor 18 and meshed to an external gear 21 formed integrally with the first ring gear $15_1$ of the first planetary gear mechanism $P_1$.

The operation of the first embodiment of the present invention having the above-described construction will be described below.

During straight forward traveling of the vehicle, the hydraulic motor 18 is maintained in a stopped state. And the first ring gear $15_1$ of the first planetary gear mechanism $P_1$ connected to the hydraulic motor 18 through the pinion 20 and the external-tooth gear 21 is fixed. At this time, the second ring gear $15_2$ of the second planetary gear mechanism $P_2$ is also fixed to the casing and hence, the first and second ring gears $15_1$ and $15_2$ are both fixed. On the other hand, the first and second sun gears $14_1$ and $14_2$ are formed integrally with each other. Thus, the first planetary carrier $12_1$ supporting the first planetary gear $13_1$ meshed with the first sun gear $14_1$ and the first ring gear $15_1$ is rotated at the same number of rotations and in the same direction relative to the second planetary carrier $12_2$ supporting the second planetary gear $13_2$ meshed with the second sun gear $14_2$ and the second ring gear $15_2$.

The right shaft 9 integral with the first planetary carrier $12_1$ and the left shaft 10 integral with the second planetary carrier $12_2$ are rotated in the same direction at the same rotational number, and the rotational numbers of the planetary carrier 8 and the sun gear 5 which are a pair of the output elements of the differential D are forcedly matched to each other, thereby causing the vehicle to travel straight.

Now, if a steering wheel is operated to turn the vehicle, a necessary difference in rotating speed between the left and right wheels $W_R$ and $W_L$ is calculated on the basis of a steering angle and a vehicle speed, and the hydraulic motor 18 is driven in a direction and at a number of revolutions both corresponding to the difference in rotating speed. As a result, the first ring gear $15_1$ of the first planetary gear mechanism $P_1$, fixed to the casing, is rotated, so that a difference in rotation is produced between the first ring gear $15_2$ and the second ring gear $15_2$ of the second planetary gear mechanism $P_2$. This difference in rotation causes a differential rotation even between the first and second planetary carriers $12_1$ and $12_2$ and ultimately, a difference in rotation corresponding to the number of revolutions and the rotational direction of the hydraulic motor 18 is produced between the right shaft 9 integral with the first planetary carrier $12_2$ and the left shaft 10 integral with the second planetary carrier $12_2$. The difference in rotation between the right and left shafts 9 and 10 is absorbed by the outer and inner planetary gears 6 and 7 of the differential D.

The above-described operation of the torque distributing mechanism 11 will be further described in detail.

Here, the numbers of rotations of the first and second planetary carriers $12_1$ and $12_2$ of the first and second planetary gear mechanisms $P_1$ and $P_2$ are represented by $Nc_1$ and $Nc_2$; the numbers of rotations of the first and second ring gears $15_1$ and $15_2$ are represented by $Nr_1$ and $Nr_2$; the numbers of rotations of the first and second sun gears are represented by $Ns_1$ and $Ns_2$; the number of rotations of the right shaft is represented by $N_R$; and the number of rotations of the left shaft is represented by $N_L$.

As well known, a following equation:

$$(1+\lambda)Nc_1 = Nr_1 + \lambda Ns_1 \qquad (2)$$

is established for the first planetary gear mechanism $P_2$, and a following equation:

$$(1+\lambda)Nc_2 = Nr_2 + \lambda Ns_2 \qquad (3)$$

is established for the second planetary gear mechanism $P_2$, wherein $\lambda$ is a ratio ($\lambda = Zs/Zr$) of the number of teeth of the sun gear $14_1$, $14_2$ to the number of teeth of the ring gear $15_1$, $15_2$.

During a straight forward traveling of the vehicle, the hydraulic motor 18 is not driven and hence, the ring gear $15_2$, of the first planetary gear mechanism $P_1$ is in its stopped state. Therefore, $Nr_1 = 0$ is incorporated into the equation (2) to give a following equation:

$$Ns_1 = \{(1+\lambda)/\lambda\}Nc_1 \qquad (4)$$

Since the ring gear $15_2$ of the second planetary gear mechanism $P_2$ is fixed to the casing, $Nr_2 = 0$ is incorporated into the equation (3) to give a following equation:

$$Ns_2 = \{(1+\lambda)/\lambda\}Nc_2 \qquad (5)$$

Because the first and second sun gears $14_1$ and $14_2$ are coupled integrally, $Ns_1 = Ns_2$ and hence, $Nc_1 = Nc_2$ is established from the above equations (4) and (5).

More specifically, when the hydraulic motor 18 is not driven, the number of rotations $Nc_1$, of the first planetary carrier $12_1$ and the number of rotations $Nc_2$ of the second planetary carrier $12_2$ are maintained at the same value and as a result, the number of rotations of the right shaft 9 integral with the first planetary carrier $12_1$ is the same as the number of rotations of the left shaft 10 integral with the second planetary carrier $12_2$.

A consideration will be given about the case where the vehicle is being turned.

The equations (2) and (3) are subjected to a subtraction of their corresponding sides from each other, thereby giving a following equation:

$$(1+\lambda)(Nc_2 - Nc_1) = (Nr_2 - Nr_1) + \lambda(Ns_2 - Ns_1) \qquad (6)$$

In this case, $Nc_2 - Nc_1$ (a differential rotation between the first and second planetary carriers $12_1$ and $12_2$) is equal to $N_R - N_L = \Delta N$ (a differential rotation between the left and right shafts 9 and 10); $Ns_2 - Ns_1$ (a differential rotation between the first and second sun gears $14_1$ and $14_2$) is equal to 0; and $Nr_2$ (the number of rotations of the second ring gear $15_2$ fixed to the casing) is equal to 0. Therefore, they are incorporated into the equation (6) to give a following equation:

$$Nr_1 = -(1+\lambda)\Delta N \qquad (7)$$

The equation (7) indicates that in order to provide a differential rotation between the left and right shafts 9 and 10, the first ring gear $15_1$ of the first planetary gear mechanism $P_1$ may be driven at a number of rotations equal to $-(1+\lambda)\Delta N$ by the hydraulic motor 18.

Figure 5:
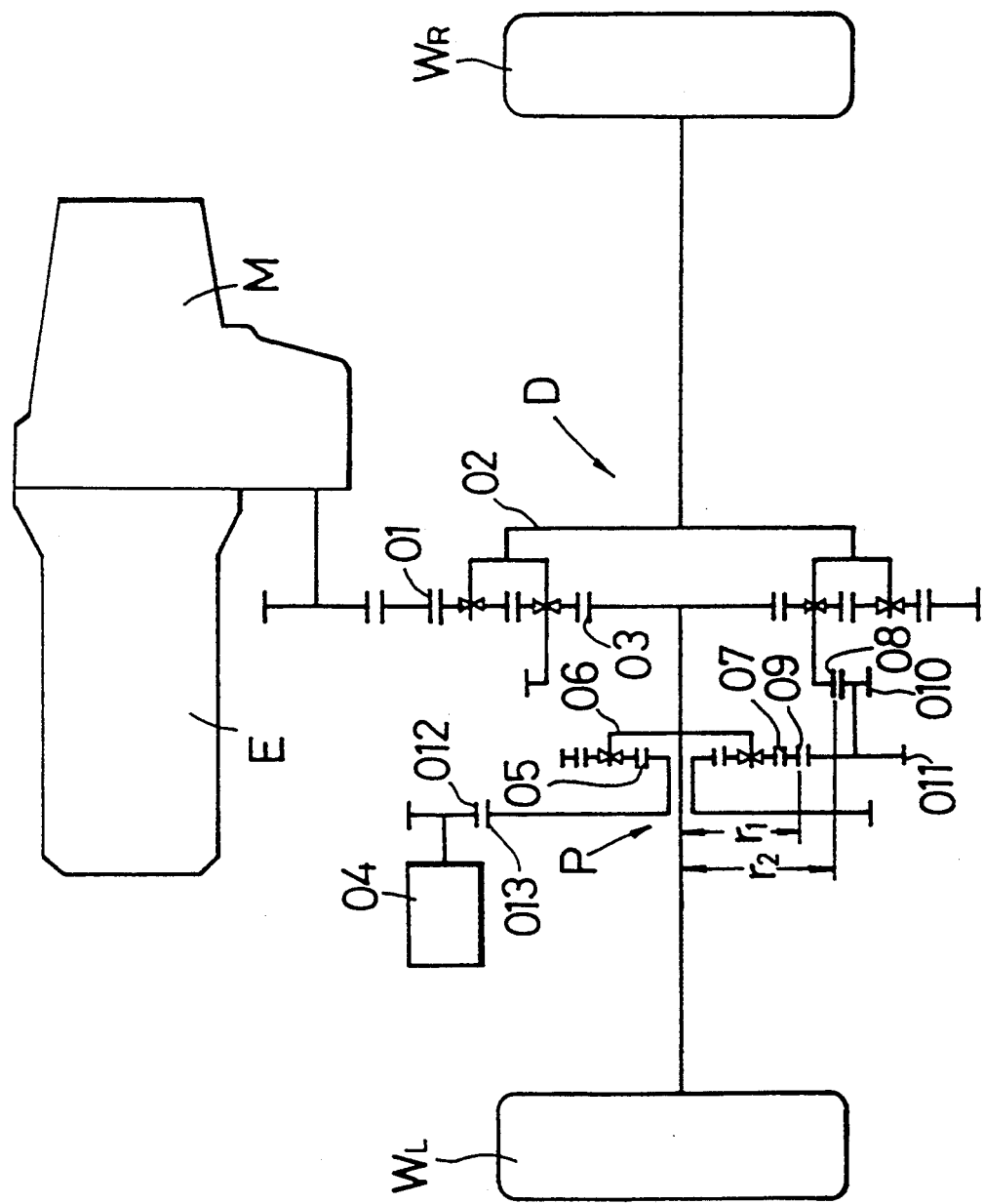
FIG. 5 is an illustration of a prior art torque distributing mechanism for a differential.

The torque distributing mechanism 11 in the first embodiment ensures that spur gears 010 and 011 (see FIG. 5) for connecting the differential D and the planetary gear mechanism P, which are required in the prior art, are not required and for this reason, the diametrical dimension of the torque distributing mechanism 11 can be reduced. Moreover, setting of the number of teeth in the above-described equation (1) required when the spur gears 010 and 011 are used is not required, leading to a substantially improved degree of freedom in design. In addition, because the torque distributed to the right and left wheels $W_R$ and $W_L$ is dispersed to the first planetary gear mechanism $P_1$, the second planetary gear mechanism $P_2$ and the differential D, the strength of each of the gears can be lowered to reduce the weight.

Figure 2:
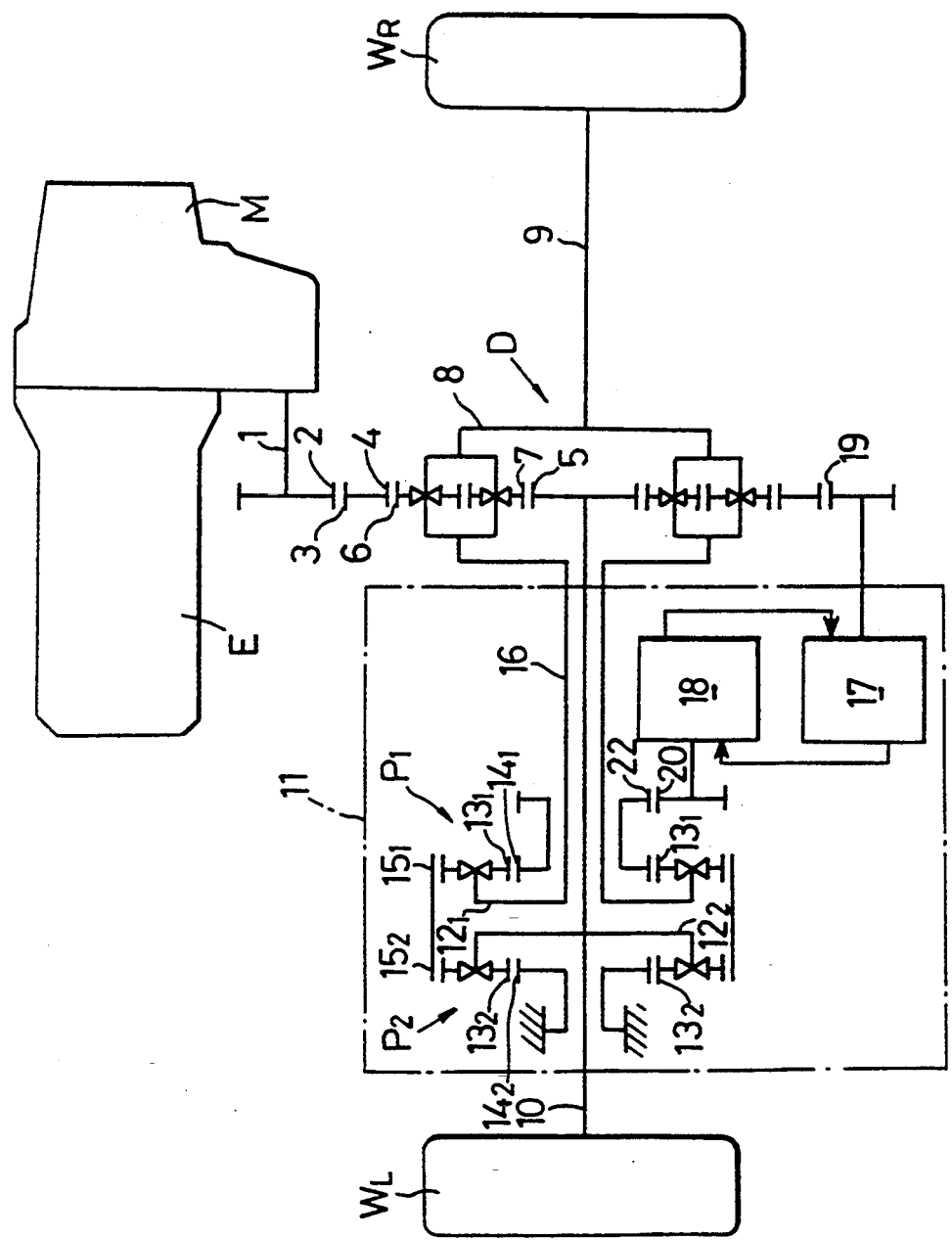
FIG. 2 is an illustration of a torque distributing mechanism for a differential according to a second embodiment of the present invention.

FIG. 2 illustrates a second embodiment of the present invention.

The relationship between the first and second embodiments is such that the roles of the first and second sun gears $14_1$ and $14_2$ and the first and second ring gears $15_1$ and $15_2$ are replaced by each other. More specifically, in the second embodiment, the first and second ring gears $15_1$ and $15_2$ are integrally formed, and the external-tooth gear 22 formed on the first sun gear $14_1$ is meshed with the pinion 20 of the hydraulic motor 18, while the second sun gear $14_2$ is fixed to the casing.

Even with the second embodiment, an effect of operation similar to that in the first embodiment can be provided.

The roles of three elements of the first and second planetary gear mechanisms $P_1$ and $P_2$, i.e., the pair of planetary carriers $12_1$ and $12_2$, the pair of sun gears $14_1$ and $14_2$ and the pair of the ring gears $15_1$ and $15_2$ can be replaced by each other. The first and second embodiments illustrate two of six types of combinations.

Figure 3:
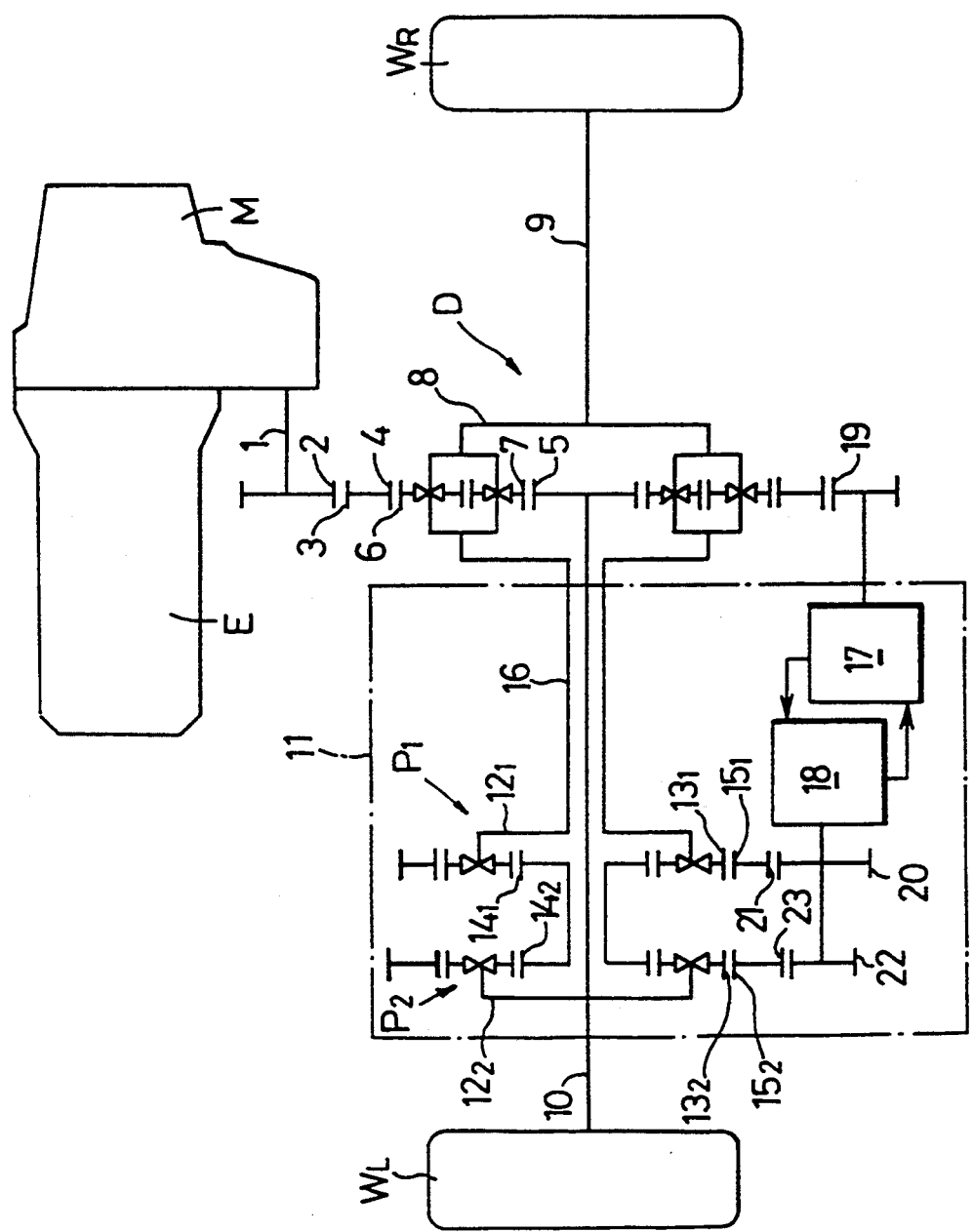
FIG. 3 is an illustration of a torque distributing mechanism for a differential according to a third embodiment of the present invention.

FIG. 3 illustrates a third embodiment. In this third embodiment, the second planetary carrier $12_2$ in the second planetary gear mechanism $P_2$ is coupled to the left shaft 10, and the sun gear $14_2$ is formed integrally with the first sun gear $14_1$.

The torque distributing mechanism 11 includes a hydraulic pump 17 driven by the engine E, and a hydraulic motor 18 driven by an oil discharged from the hydraulic pump 17. The hydraulic pump 17 is driven with a pinion 19 fixed to an input shaft thereof being meshed with an external-tooth gear 3 of the differential D. The hydraulic motor 18 has a pinion 20 fixed to an output shaft thereof and meshed with an external-tooth gear 21 formed integrally with the first ring gear $15_1$ of the first planetary gear mechanism $P_1$, and a pinion 22 fixed to the output shaft thereof and meshed with the second ring gear $15_2$ of the second planetary gear mechanism $P_2$. The reduction ratio from the pinion 20 to the external-tooth gear 21 is set slightly smaller than the reduction ratio from the pinion 22 to the external-tooth gear 23. Thus, when the hydraulic motor 18 is driven, the first ring gear $15_1$ of the first planetary gear mechanism $P_1$ is rotatively driven at a number of rotations slightly larger than that of the second ring gear $15_2$ of the second planetary gear mechanism $P_2$.

The operation of the third embodiment of the present invention having the above-described construction will be described below.

During straight forward traveling of the vehicle, the hydraulic motor 18 is maintained at a stopped state, and the first ring gear $15_1$ of the first planetary gear mechanism $P_1$ connected to the hydraulic motor 18 through the pinion 20 and the external-tooth gear 21, and the second ring gear $15_2$ of the second planetary gear mechanism $P_2$ connected to the hydraulic motor 18, through the pinion 22 and the external-tooth gear 23, are fixed together. On the other hand, because the first and second sun gears $14_1$ and $14_2$ are formed integrally, the first planetary carrier $12_1$ supporting the first planetary gear $13_1$, meshed with both the first sun gear $14_1$, and the first ring gear $15_1$ is rotated at the same number of rotations and in the same direction as the second planetary carrier $12_2$ supporting the second planetary gear $13_2$ meshed with both the second sun gear $14_2$ and the second ring gear $15_2$.

As a result, the right shaft 9 integral with the first planetary carrier $12_1$ and the left shaft 10 integral with the second planetary carrier $12_2$ are rotated in the same number of rotations and in the same direction, so that the numbers of rotations of the planetary carrier 8 and the sun gear 5, which are a pair of output elements of the differential D, are forced matched to each other, thereby causing the vehicle to be traveled straightly.

When the steering wheel is now operated to turn the vehicle, the speed of a required differential rotation between the left and right wheels $W_L$ and $W_R$ is calculated on the basis of a steering angle and a vehicle speed, and the hydraulic motor 18 is driven at a number of revolutions and in a direction both of which correspond to a speed of such differential rotation. As a result, the first ring gear $15_1$ of the first planetary gear mechanism $P_1$ and the second ring gear $15_2$ of the second planetary gear mechanism $P_2$ are rotated at slightly different numbers of rotations, whereby a differential rotation is generated between the first and second ring gears $15_1$ and $15_2$. This differential rotation causes a differential rotation to be also generated between the first and second planetary carriers $12_1$ and $12_2$. Ultimately, a differential rotation corresponding to the number of revolutions and the rotational direction of the hydraulic motor 18 is generated between the right shaft 9 integral with the first planetary carrier $12_1$ and the left shaft 10 integral with the second planetary carrier $12_2$. The differential rotation between the right and left shafts 9 and 10 is absorbed by the outer and inner planetary gear 6 and 7 of the differential D.

The operation of the torque distributing mechanism 11 will be described in further detail.

The numbers of rotations of the first and second planetary carriers $12_1$ and $12_2$ of the first and second planetary gear mechanisms $P_1$ and $P_2$ are represented by $Nc_1$ and $Nc_2$; the numbers of rotations of the first and second ring gears $15_1$ and $15_2$ are by $Nr_1$ and $Nr_2$; the numbers of rotations of the first and second sun gears are by $Ns_1$ and $Ns_2$; the number of rotations of the right shaft is by $N_R$; and the number of rotations of the left shaft is by $N_L$.

As well known, a following equation:

$$(1+\lambda)Nc_1 = Nr_1 + \lambda Ns_1 \tag{8}$$

is established for the first planetary gear mechanism $P_1$, and a following equation:

$$(1+\lambda)Nc_2 = Nr_2 + \lambda Ns_2 \tag{9}$$

is established for the second planetary gear mechanism $P_2$ wherein $\lambda$ is a ratio $\{\lambda = Zs/Zr\}$ of the number of teeth of the sun gear $14_1$, $14_2$ to the number of teeth of the ring gear $15_1$, $15_2$.

During a straight forward traveling of the vehicle, the hydraulic motor 18 is not driven and hence, the ring gear $15_1$ of the first planetary gear mechanism $P_1$ is in its stopped state. Therefore, $Nr_1 = 0$ is incorporated into the equation (8) to give a following equation:

$$Ns_1 = \{(1+\lambda)/\lambda\}Nc_1 \tag{10}$$

Since the ring gear $15_2$ of the second planetary gear mechanism $P_2$ is also in a stopped state, $Nr_2 = 0$ is incorporated into the equation (9) to give a following equation:

$$Ns_2 = \{(1+\lambda)/\lambda\} Nc_2 \quad (11)$$

Because the first and second sun gears $14_1$ and $14_2$ are coupled integrally, $Ns_1 = Ns_2$ and hence, $Nc_1 = Nc_2$ is established from the above equations (10) and (11). More specifically, when the hydraulic motor 18 is not driven, the number $Nc_1$ of rotations of the first planetary carrier $12_1$ and the number $Nc_2$ of rotations of the second planetary carrier $12_2$ are maintained at the same value and as a result, the number $N_R$ of rotations of the right shaft 9 integral with the first planetary carrier $12_1$ is the same as the number $N_L$ of rotations of the left shaft 10 integral with the second planetary carrier $12_2$.

A consideration will be given about the case where the vehicle is being turned.

The equations (8) and (9) are subjected to a subtraction of their corresponding sides from each other, thereby giving a following equation:

$$(1+\lambda)(Nc_2 - Nc_1) = (Nr_2 - Nr_1) + \lambda(Ns_2 - Ns_1) \quad (12)$$

In this case, $Nc_2 - Nc_1$ (a differential rotation between the first and second planetary carriers $12_1$ and $12_2$) is equal to $N_R - N_L = \Delta N$ (a differential rotation between the left and right shafts 9 and 10), and $Ns_2 - Ns_1$ (a differential rotation between the first and second sun gears $14_1$ and $14_2$) is equal to 0. Therefore, they are incorporated into the equation (12) to give a following equation:

$$Nr_2 - Nr_1 = (1+\lambda)\Delta N \quad (13)$$

The equation (13) indicates that in order to provide a differential rotation corresponding to $\Delta N$ between the left and right shafts 9 and 10, a differential rotation corresponding to $(1+\lambda)\Delta N$ may be provided between the first and second ring gears $15_1$ and $15_2$ by the hydraulic motor 18.

Now, if the number of teeth of the pinion 20 is represented by $A_1$; the number of teeth of the pinion 22 is by $A_2$; the number of teeth of the external-tooth gear 21 is by $B_1$; and the number of teeth of the external-tooth gear 23 is by $B_2$, the reduction ratio $i_1$ from the hydraulic motor 18 to the first ring gear $15_1$ is represented by $i_1 = B_1/A_1$, and the reduction ratio $i_2$ from the hydraulic motor 18 to the second ring gear $15_2$ is represented by $i_2 = B_2/A_2$.

When the hydraulic motor 18 is driven at a number of revolutions Nm, a differential rotation $Nr_2 - Nr_1$ between the first and second ring gears $15_1$ and $15_2$ is provided by $$Nr_2 - Nr_1 = Nm/i_2 - Nm/i_1 = Nm\{(i_1-i_2)/i_1 \cdot i_2\} \quad (14)$$

Therefore, from the above equations (13) and (14), following equations $Nr_1$ are derived:

$$Nm = \Delta N(1+\lambda)i_1 i_2/(i_1-i_2) = \alpha \Delta N \quad (15)$$

$$\alpha = (i+\lambda)i_1 i_2/(i_1-i_2) \quad (16)$$

wherein $\alpha$ is a reduction ratio from the hydraulic motor 18 to the right and left shafts 9 and 10.

The equation (15) indicates that in order to provide a differential rotation corresponding to $\Delta N$ between the right and left shafts 9 and 10 during turning of the vehicle, the number of revolutions of the hydraulic motor 18 may be set at a value resulting from multiplication of the-differential rotation $\Delta N$ by the reduction ratio $\alpha(1+\lambda)i_1 i_2/(i_1-i_2)$.

In general, the magnitude of an input torque required to exhibit a predetermined output torque through a power transmitting path may be smaller, as the reduction ratio through such power transmitting path is larger. Therefore, a torque of the hydraulic motor 18 required to provide a differential rotation corresponding to $\Delta N$ between the right and left shafts 9 and 10 may be smaller, as the reduction ratio from the hydraulic motor 18 to the right and left shafts 9 and 10 is larger. That is, a torque Tm of the hydraulic motor 18 required to exhibit a torque T enough to provide the differential rotation corresponding to $\Delta N$ between the right and left shafts 9 and 10 is determined by a following equation:

$$Tm = T/\alpha = T(i_1-i_2)/(1+\lambda)i_1 i_2 \quad (17)$$

As apparent from the equation (17), the torque Tm of the hydraulic motor 18 required to produce a differential rotation $\Delta N$ can be reduced to any extent by setting a smaller difference $i_1 - i_2$ between the reduction ratio $i_1$ from the hydraulic motor 18 to the first ring gear $15_1$ and the reduction ratio $i_2$ from the hydraulic motor 18 to the second ring gear $15_2$. Therefore, it is possible to use a small-sized and lightweight, small-torque hydraulic motor 18 without unnecessarily increasing the number of teeth of the external-tooth gears 21 and 23.

Figure 4:
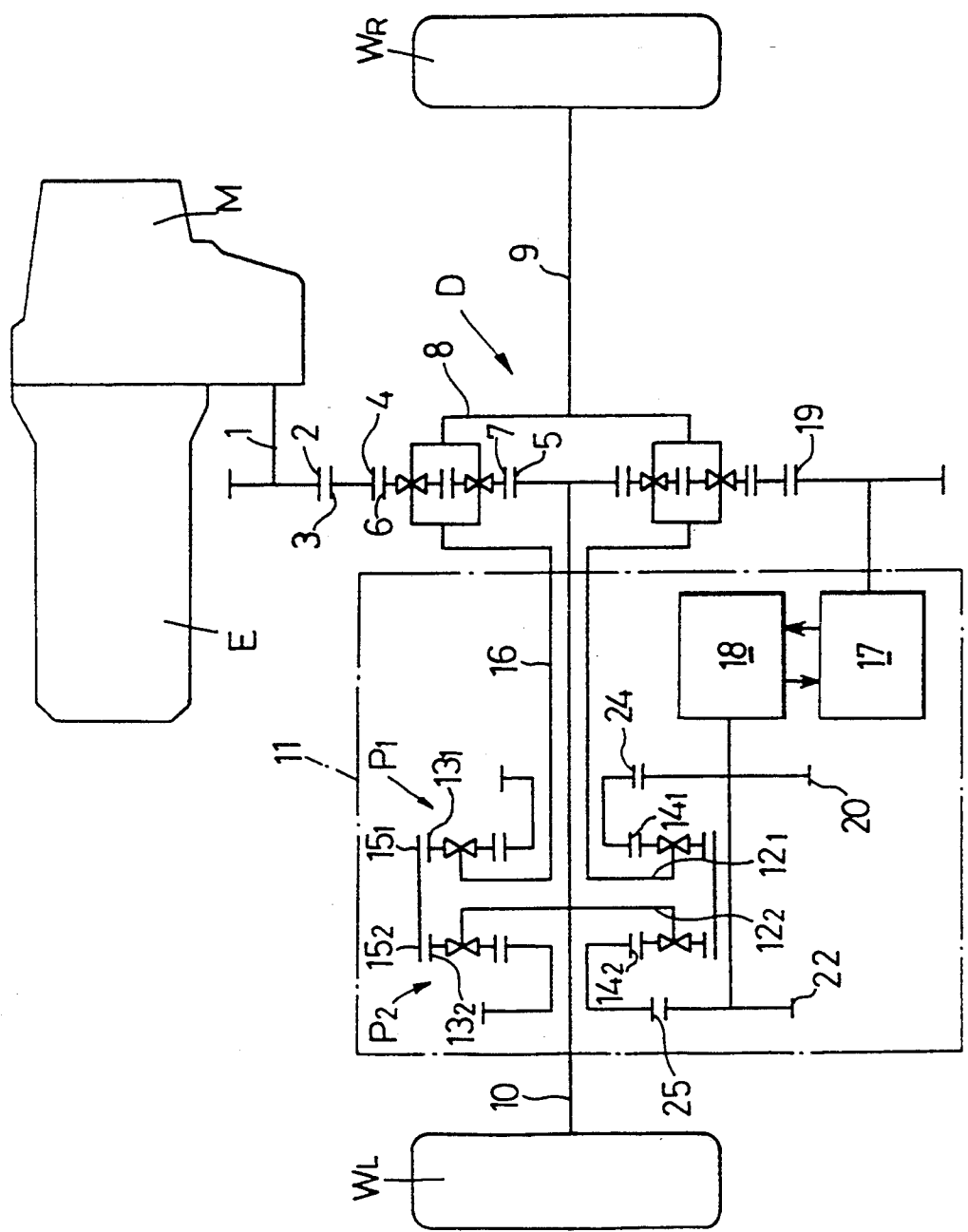
FIG. 4 is an illustration of a torque distributing mechanism for a differential according to a fourth embodiment of the present invention.

FIG. 4 illustrates a fourth embodiment of the present invention.

The relationship between the third and fourth embodiments is such that the roles of the first and second sun gears $14_1$ and $14_2$ and the first and second ring gears $15_1$ and $15_2$ are replaced by each other. More specifically, in the fourth embodiment, the first and second ring gears $15_1$ and $15_2$ are formed integrally, and an external-tooth gear 24 formed on the first sun gear $14_1$ is mashed with the pinion 20 of the hydraulic motor 18, while an external-tooth gear 25 formed on the second sun gear $14_2$ is meshed with the pinion 22 of the hydraulic motor 18. The reduction ratio from the pinion 20 to the external-tooth gear 24 is set slightly smaller than the reduction ratio from the pinion 22 to the external-tooth gear 25. Thus, when the hydraulic motor 18 is driven, the first sun gear $14_1$ of the first planetary gear mechanism $P_1$ is rotatively driven at a number of rotations slightly larger than that of the second sun gear $14_2$ of the second planetary gear mechanism $P_2$.

Even with the fourth embodiment, an effect of operation similar to that in the third embodiment can be provided.

Although the embodiments of the present invention have been described in detail, it will be understood that the present invention is not limited to these embodiments, and various modifications in design can be made without departing from the spirit and scope of the invention defined in claims.

For example, in the planetary gear type differential D, it is properly selectable to use which of the ring gear 4, the sun gear 6 and the planetary carrier 8 as an input element or an output element.

In addition, the roles of the three elements of the first and second planetary gear mechanisms $P_1$ and $P_2$, i.e., the pair of planetary carriers $12_1$ and $12_2$, the pair of sun gears $14_1$ and $14_2$ and the pair of ring gears $15_1$ and $15_2$, can be replaced by each other. The third and fourth embodiments illustrate two of six types of combinations.

The first and second planetary gear mechanisms $P_1$ and $P_2$ need not necessarily be of the same specification in which the numbers of teeth of the corresponding gears are set at the same value, but these planetary gear mechanisms $P_1$ and $P_2$ may be of similar specifications in which the numbers of teeth of the corresponding gears are set at a given ratio.

Further, the torque distributing mechanism according to the present invention is not limited in application to the driving system for the front wheels of the vehicle, but is also applicable to a distribution of torque between the front and rear wheels in a four-wheel drive vehicle.

What is claimed is:

1. A torque distributing mechanism for a differential which comprises a single input element and two output elements, in which a torque applied to the input element of said differential is distributed to the two output elements at a predetermined ratio, said torque distributing mechanism comprising a first planetary gear mechanism comprised of a first ring gear, a first sun gear, and a first planetary carrier which supports a first planetary gear meshed with said first ring gear and said first sun gear, and a second planetary gear mechanism comprised of a second ring gear, a second sun gear, and a second planetary carrier which supports a second planetary gear meshed with said second ring gear and said second sun gear; among a pair of said first and second planetary carriers, a pair of said first and second ring gears and a pair of said first and second sun gears, any one of the pairs being coupled to said two output elements, respectively, another pair being relatively non-rotatably connected to each other, and one of the rest pair being fixed, while the other of the rest pair being connected to a driving source.

2. A torque distributing mechanism for a differential according to claim 1, wherein the number of teeth of each of said first ring gear, said first sun gear and said first planetary carrier is set at a value equal to that of each of said second ring gear, said second sun gear and said second planetary carrier.

3. A torque distributing mechanism for a differential according to claim 1, wherein said differential comprises a ring gear, sun gear, and a planetary carrier which supports a planetary gear meshed with said ring gear and said sun gear.

4. A torque distributing mechanism for a differential according to claim 1, wherein said driving source comprises a hydraulic motor which is driven by a hydraulic pump connected to said input element, at least one of said hydraulic pump and said hydraulic motor being of a variable displacement type.

5. A torque distributing mechanism for a differential which comprises a single input element and two output elements, in which a torque applied to the input element of the differential is distributed to said two output elements at a predetermined ratio, said torque distributing mechanism comprising a first planetary gear mechanism comprised of a first ring gear, a first sun gear, and a first planetary carrier which supports a first planetary gear meshed with said first ring gear and said first sun gear, and a second planetary gear mechanism comprised of a second ring gear, a second sun gear, and a second planetary carrier which supports a second planetary gear meshed with said second ring gear and said second sun gear, said first planetary carrier and said second planetary carrier being coupled to one and the other of said output elements, respectively, said first sun gear and said second sun gear being relatively non-rotatably connected to each other, and one of said first and said second ring gears being fixed, while the other being connected to a driving source.

6. A torque distributing mechanism for a differential which comprises a single input element and two output elements, in which a torque applied to the input element of the differential is distributed to said two output elements at a predetermined ratio, said torque distributing mechanism comprising a first planetary gear mechanism comprised of a first ring gear, a first sun gear, and a first planetary carrier which supports a first planetary gear meshed with said first ring gear and said first sun gear, and a second planetary gear mechanism comprised of a second ring gear, a second sun gear, and a second planetary carrier which supports a second planetary gear meshed with said second ring gear and said second sun gear, said first and said second planetary carriers being coupled to one and the other of said output elements, respectively, said first and said second ring gears being relatively non-rotatably connected to each other, and one of said first and second sun gears being fixed, while the other being connected to a driving source.

* * * * *